United States Patent
Chen

(10) Patent No.: US 9,366,812 B2
(45) Date of Patent: Jun. 14, 2016

(54) DISPLAY WALL CAPABLE OF DISPLAYING A CONTINUOUS IMAGE AND DISPLAY DEVICE OF SAME

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 28 days.

(21) Appl. No.: 14/097,571

(22) Filed: Dec. 5, 2013

(65) Prior Publication Data

US 2015/0062958 A1 Mar. 5, 2015

(30) Foreign Application Priority Data

Aug. 27, 2013 (TW) .............................. 102130600 A

(51) Int. Cl.
*F21V 9/16* (2006.01)
*G02B 6/06* (2006.01)
*F21V 8/00* (2006.01)

(52) U.S. Cl.
CPC ................ *G02B 6/06* (2013.01); *G02B 6/0008* (2013.01)

(58) Field of Classification Search
CPC .. G02B 6/0045; G02B 6/0005; G02B 6/0001; G02B 6/0003; G02B 6/0078; F21S 48/1241; F21S 48/125; F21S 48/1168; F21S 48/2231
USPC .......................................................... 362/561
See application file for complete search history.

(56) References Cited

U.S. PATENT DOCUMENTS

| | | | | |
|---|---|---|---|---|
| 6,892,014 | B2* | 5/2005 | Cok et al. ....................... | 385/120 |
| 7,228,051 | B2* | 6/2007 | Cok et al. ....................... | 385/146 |
| 7,592,971 | B2* | 9/2009 | Chang et al. .................... | 345/1.3 |
| 7,982,823 | B1* | 7/2011 | Feng ................................ | 349/62 |
| 8,976,324 | B2* | 3/2015 | Yang et al. ...................... | 349/92 |
| 2005/0259927 | A1* | 11/2005 | Kato ..................... | G02B 6/4204 385/93 |
| 2006/0012733 | A1* | 1/2006 | Jin ....................... | G02F 1/13336 349/73 |
| 2007/0103854 | A1* | 5/2007 | Yu .......................... | G06F 1/1601 361/679.22 |
| 2007/0154145 | A1* | 7/2007 | Miyadera ............... | G02B 6/125 385/49 |

* cited by examiner

*Primary Examiner* — Tracie Y Green
(74) *Attorney, Agent, or Firm* — Novak Druce Connolly Bove + Quigg LLP

(57) ABSTRACT

A display device includes a display panel, a frame, and a light guide member. The display panel includes a display surface configured for displaying an image. The frame is located adjacent to edges of the display surface. The light guide member includes a plurality of optical fibers arranged in an array. Each optical fiber includes a light incident end and a light emitting end opposite to the light incident end. The light incident ends of the plurality of optical fibers form a light incident surface only covering the display surface, and the light emitting ends of the plurality of optical fibers form a light emitting surface completely covering the frame.

2 Claims, 5 Drawing Sheets

DISPLAY WALL CAPABLE OF DISPLAYING A CONTINUOUS IMAGE AND DISPLAY DEVICE OF SAME

BACKGROUND

1. Technical Field

The present disclosure relates to a display device and a display wall including a number of the display devices.

2. Description of Related Art

A display wall includes a number of display devices arranged in an array. Yet, as each display device has a frame surrounding a display panel, an image displayed by the display wall is divided into separated portions by the frames.

Therefore, it is desirable to provide a display device and a display wall which can overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
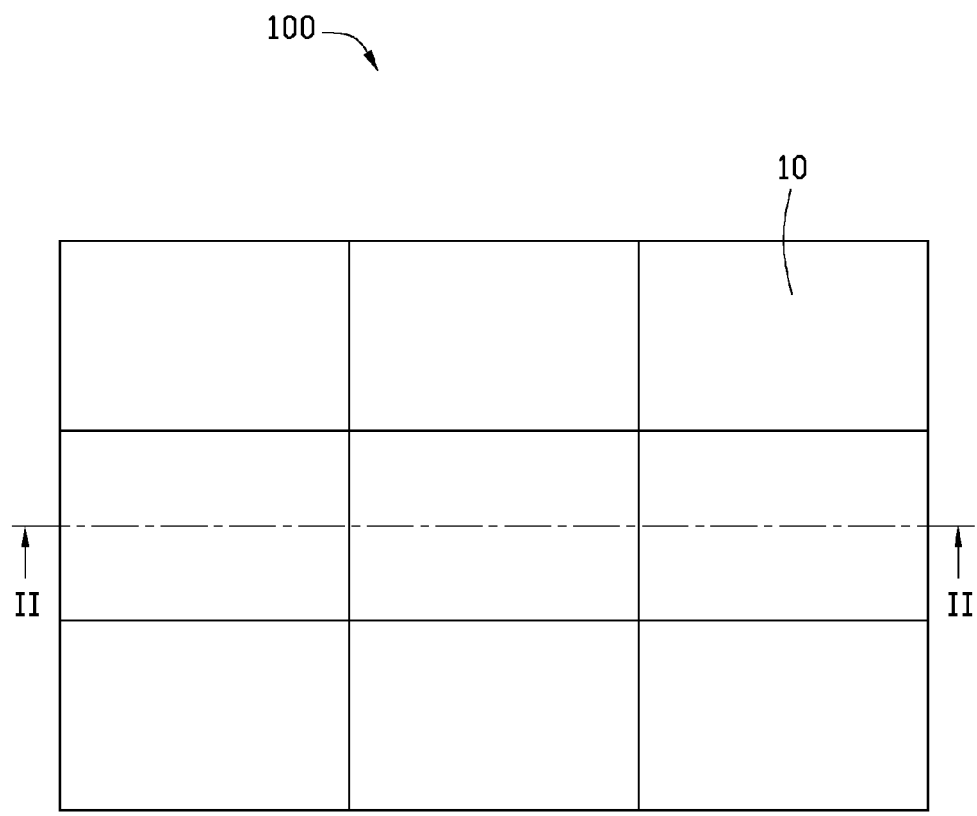
FIG. 1 is a schematic, front view of a display wall according to a first embodiment of the present disclosure.
Figure 2:
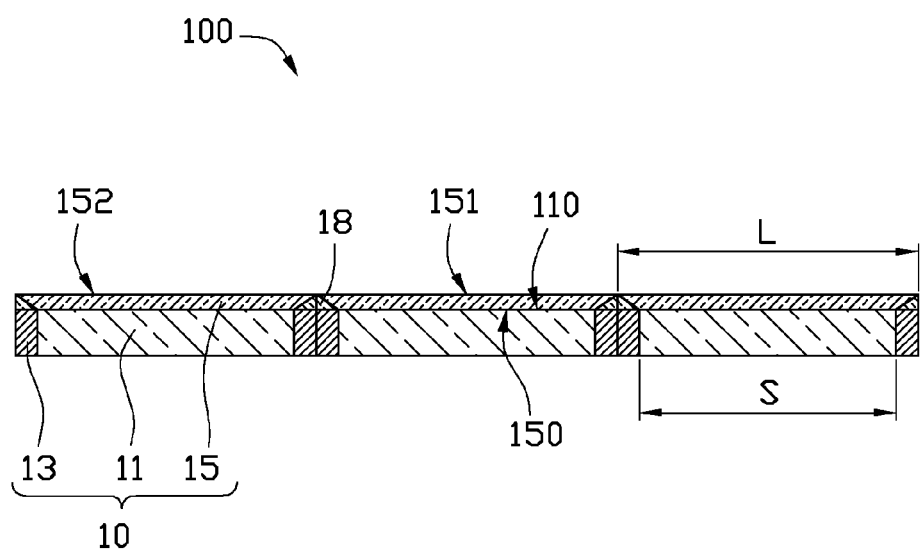
FIG. 2 is a cross-sectional view taken along II-II line of the display wall of FIG. 1, the display wall including a number of display devices, each display device including a light guide member.
Figure 3:
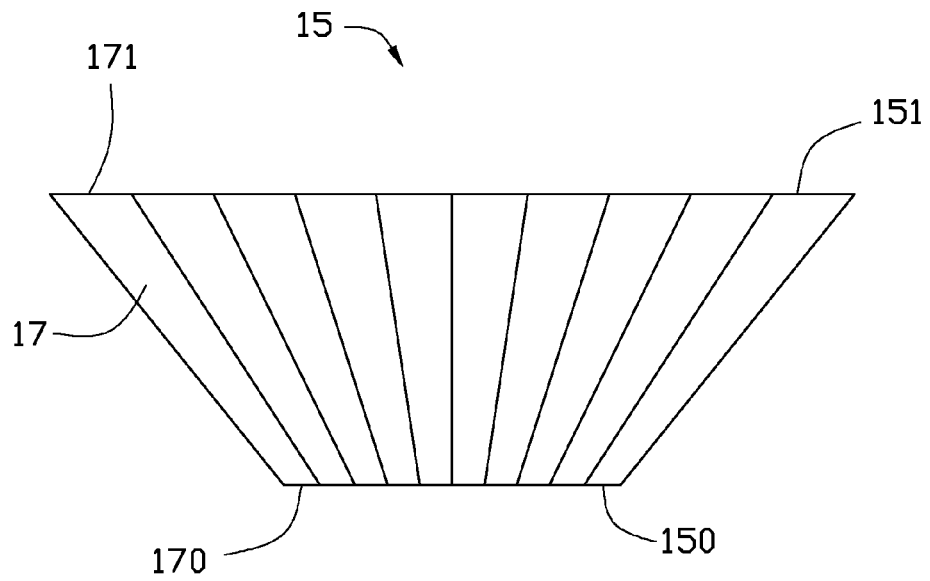
FIG. 3 is a schematic, enlarged view of the light guide member of FIG. 2.

FIGS. 1 to 3 show a display wall 100 according to a first embodiment of the present disclosure. The display wall 100 includes a number of display devices 100 arranged in an array. In this embodiment, the display wall 100 includes nine display devices 100. The display devices 10 form a 3-by-3 array. There are no gaps between each two adjacent display devices 10.

In this embodiment, the display device 10 is a liquid crystal display device. In other embodiments, the display device 10 can also be any known type of display device, such as a plasma display device, for example. Each of the display devices 10 includes a display panel 11, a frame 13 and a light guide member 15.

The display panel 11 includes a display surface 110 for displaying image, the edges of the display panel 11 is mounted on the frame 13. The frame 13 surrounds the display surface 110 and supports the display panel 11. The frame 13 is made of opaque resin. The color of the frame 13 is black.

The light guide member 15 is directly located on the display panel 11 and the frame 13. The light guide member 15 includes a light incident surface 150 and a light emitting surface 151 opposite to the light incident surface 150. The light incident surface 150 is adjacent to the display surface 110. A size of the light incident surface 150 is substantially the same as a size of the display surface 110. The light emitting surface 151 covers the display surface 110 and the frame 13 completely. Light emitting surfaces 151 of different display devices 10 are connected together to form a light emitting surface 152 of the display wall 100. The light emitting surface 152 has no gaps.

The light guide member 15 includes a number of optical fibers 17 arranged in an array. The optical fibers 17 contact each other. Each optical fiber 17 includes a light incident end 170 at the light incident surface 150 and a light emitting end 171 at the light emitting surface 171. The light incident ends 170 cooperatively form the light incident surface 150. The light emitting ends 171 cooperatively form the light emitting surface 151. Along a direction parallel to the display surface 110, a size of the light emitting end 171 is bigger than a size of the light incident end 170. In this embodiment, a length of the display surface 110 is S, a length of the display device 10 is L, and a ratio of the size of the light emitting end 171 to the size of the light incident end 170 is L/S.

When working, optical signals representing portions of an image emitted from each display surface 110 enter the optical fibers 17 from the light incident ends 170 and are emitted out from the light emitting ends 171. As the sizes of the light emitting ends 171 are larger than the sizes of the light incident ends 170, the image is enlarged by the optical fibers 17. As the light emitting surface 152 covers the frame 13, the image will be seen as a whole and the light emitting surface 152 can display a continuous image that is not separated by the frame 13.

The light guide member 15 further includes an adhesive layer 18 located between the light emitting surface 151 and the frame 13 for connecting the light guide member 15 to the frame 13.

Figure 4:
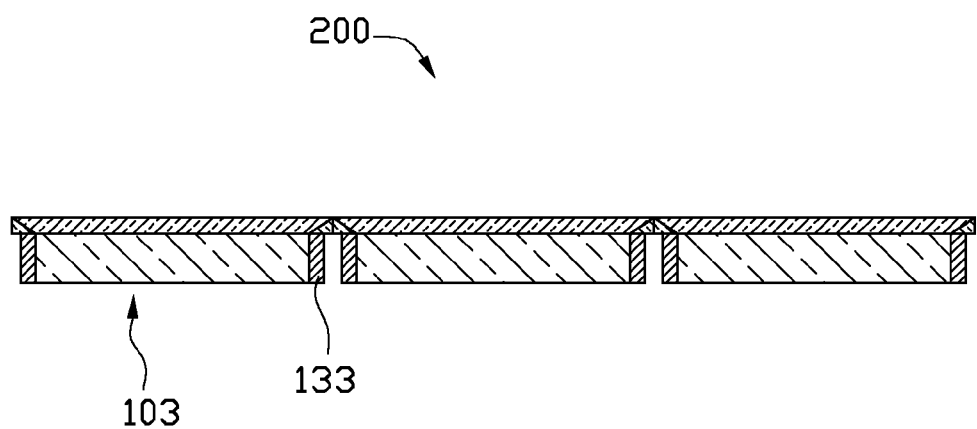
FIG. 4 is a cross-sectional view a display wall according to a second embodiment of the present disclosure.

FIG. 4 shows a display wall 200 according to a second illustrated embodiment. The structure of the display wall 200 is similar to the structure of the display wall 100 except that in the display wall 200, gaps exist between each two adjacent frames 133 of different display devices 103.

Figure 5:
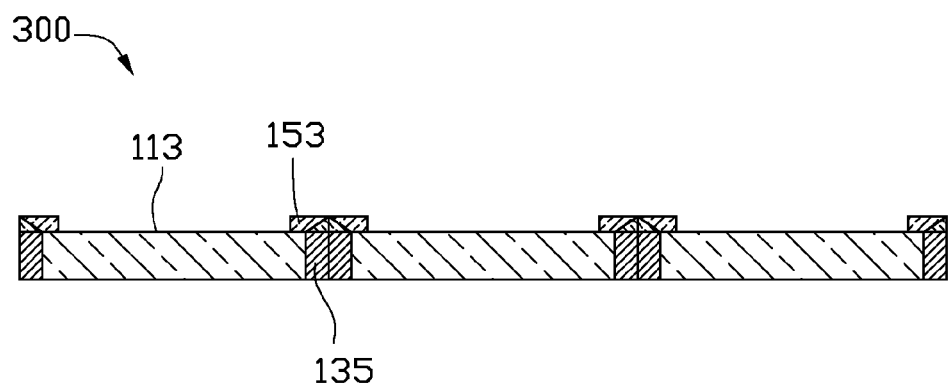
FIG. 5 is a cross-sectional view a display wall according to a third embodiment of the present disclosure.

FIG. 5 shows a display wall 300 according to a third illustrated embodiment. The structure of the display wall 300 is similar to the structure of the display wall 100 except that in the display wall 300, a light guide member 153 only covers a frame 135 and parts of a display surface 113 adjacent to the frame 135. The light guide member 153 does not cover the center portions of the display surface 113.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A display device comprising:
   a display panel comprising a display surface configured for displaying an image;
   a frame located adjacent to edges of the display surface, the frame made of opaque resin; and
   a light guide member comprising a plurality of optical fibers arranged in an array, each optical fiber comprising a light incident end and a light emitting end opposite to the light incident end, the light incident ends of the plurality of optical fibers forming a light incident surface only covering the display surface, the light emitting ends of the plurality of optical fibers forming a light emitting surface completely covering the frame;
   wherein the light guide member further comprises an adhesive layer for connecting the light guide member to the frame, a topmost surface of the frame is coplanar with the display surface, and the adhesive layer is filled in a gap between the light guide member and the frame to bond the light guide member and the frame together.

2. A display wall comprising:

a plurality of display devices, each display device comprising:

- a display panel comprising a display surface configured for displaying an image;
- a frame located adjacent to edges of the display surface, the frame made of opaque resin; and
- a light guide member comprising a plurality of optical fibers arranged in an array, each optical fiber comprising a light incident end and a light emitting end opposite to the light incident end, the light incident ends of the plurality of optical fibers forming a light incident surface only covering the display surface, the light emitting ends of the plurality of optical fibers forming a light emitting surface completely covering the frame;

the plurality of display devices being arranged in an array, the light emitting surfaces belong to adjacent display devices being connected to each other;

wherein the light guide member further comprises an adhesive layer for connecting the light guide member to the frame, a topmost surface of the frame is coplanar with the display surface, and the adhesive layer is filled in a gap between the light guide member and the frame to bond the light guide member and the frame together.

\* \* \* \* \*